(12) United States Patent
Zhang et al.

(10) Patent No.: US 7,340,323 B2
(45) Date of Patent: *Mar. 4, 2008

(54) INDUSTRIAL ROBOT WITH CONTROLLED FLEXIBILITY AND SIMULATED FORCE FOR AUTOMATED ASSEMBLY

(75) Inventors: Hui Zhang, West Hartford, CT (US);
Zhongxue Gan, Windsor, CT (US);
Torgny Brogardh, Vasletas (SE);
Jianjun Wang, Willimantic, CT (US)

(73) Assignee: ABB Research Ltd., Zurich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 11/653,638

(22) Filed: Jan. 16, 2007

(65) Prior Publication Data

US 2007/0225862 A1 Sep. 27, 2007

Related U.S. Application Data

(63) Continuation of application No. 10/720,592, filed on Nov. 24, 2003, now Pat. No. 7,181,314.

(51) Int. Cl.
*G05B 15/00* (2006.01)
(52) U.S. Cl. ...................... 700/260; 700/247; 700/258;
700/249; 700/250; 700/251; 700/252; 700/253;
700/254; 700/259; 318/568.1; 901/16; 901/47;
74/490.03; 414/754; 414/575; 414/777; 414/814;
414/783
(58) Field of Classification Search ................ 700/245,
700/247, 248, 249, 250, 251, 252, 253, 254,
700/258, 259, 260, 261, 262, 263, 264; 414/754,
414/575, 777, 814, 783, 936; 901/16, 47;
74/490.03; 318/568.1
See application file for complete search history.

(56) References Cited

U.S. PATENT DOCUMENTS 4,537,557 A 8/1985 Whitney (Continued)

FOREIGN PATENT DOCUMENTS

GB 2102590 2/1983

(Continued)

OTHER PUBLICATIONS

Nirut Naksuik:"The Implementation of a Natural Admittance Controller on an Industrial Robot." Jan. 2000, Case Western Reserve University, Department of Electrical Engineering and Computer Science, Cleveland, Ohio XP002345462.

(Continued)

*Primary Examiner*—Khoi H. Tran
*Assistant Examiner*—McDieunel Marc
(74) *Attorney, Agent, or Firm*—Paul R. Katterle; Michael M. Rickin

(57) ABSTRACT

An industrial robot that uses a simulated force vector to allow a work piece held by the robot end effector to be mated with a work piece whose location and orientation is not precisely known to the robot. When the end effector makes contact with the location and orientation in which the other work piece is held the robot provides a velocity command to minimize the force of the contact and also provides a search pattern in all directions and orientations to cause the end effector to bring the work piece it is holding in contact with the other work piece. The search pattern and the velocity command are continued until the two work pieces mate.

8 Claims, 4 Drawing Sheets

U.S. PATENT DOCUMENTS

| | | | |
|---|---|---|---|
| 4,627,169 | A | 12/1986 | Zafred |
| 4,720,923 | A | 1/1988 | Quinton |
| 6,278,906 | B1 * | 8/2001 | Piepmeier et al. .......... 700/250 |
| 6,741,911 | B2 * | 5/2004 | Simmons .................... 700/245 |
| 6,938,454 | B2 * | 9/2005 | Strasser et al. ............... 72/420 |
| 7,181,314 | B2 * | 2/2007 | Zhang et al. ............... 700/254 |
| 2004/0106916 | A1 * | 6/2004 | Quaid et al. ................... 606/1 |

OTHER PUBLICATIONS

Siddharth R Chhatpar:"Experiments in Force-Guided Robotic Assembly" Jan. 1999, Case Western Reserve University, Department of Electrical Engineering and Applied Science, Cleveland, Ohio XP002345323.

Cheng Zhang: "Towards a Practical Robotic System for Industrial Mechanical Assembly" Jan. 2001, Case Western Reserve University Department of Electrical Engineering and Applied Science, Cleveland, Ohio XP002345463.

Department of Systems Science and Mathematics Campus, Apr. 1996, Washington University, St. Louis, MO 0-7803-2988 p. 3197-3202.

Bijoy K. Ghosh: Dlxiao Ning Xland Tzyh Jong Tarn:"Multisensor Based Intelligent Planning and Control for Robotic Manipulators on a Mobile Platform" Department of Systems Science and Mathematics Campus, Sep. 1996, Washington University, St. Louis, MO 0-7803-3253 p. 164-169.

* cited by examiner

```
Set Magnetic Force;
Set Destination;
Moveto StartPoint;
Activate ForceControl;
If Contact
    Activate Search;
Endif
If Destination is not reached
    Keep Searching;
Endif
Deactivate Search;
Deactivate ForceControl;
Restract
#Task Complete
```

FIG. 2

INDUSTRIAL ROBOT WITH CONTROLLED FLEXIBILITY AND SIMULATED FORCE FOR AUTOMATED ASSEMBLY

CROSS REFERENCE TO RELATED APPLICATION

This application is a continuation of and claims the priority of U.S. patent application Ser. No. 10/720,592 filed on Nov. 24, 2003, now U.S. Pat. No. 7,181,314 entitled "Industrial Robot With Controlled Flexibility And Simulated Force For Automated Assembly" the contents of which are relied upon and incorporated herein by reference in their entirety, and the benefit of priority under 35 U.S.C. 119(e) is hereby claimed.

FIELD OF THE INVENTION

This invention relates to methods and apparatus for automated assembly employing an industrial robot with controlled flexibility and system inherent simulated force to simplify machine assembly process.

DESCRIPTION OF THE PRIOR ART

In the last forty years, industrial robots have found a variety of uses in manufacturing automation. An important application domain for robotic automation that has lagged behind expectations is mechanical assembly and material removal processes. There are various advantages that robotic assembly has over human assembly since manual labor is boring, fatiguing, and can cause repetitive-motion stress injuries and injuries resulting from the manipulation by the worker of heavy objects during assembly. These effects on humans lead to problems with maintaining quality, efficiency, job satisfaction and health. In those applications where a robot could perform the job, these considerations can make automation highly attractive.

Current industrial robots are fast, precise and dependable. However, in assembly applications where the relative position between mating parts is of ultimate importance, the robot positioning accuracy by itself is not that relevant because the relative position of the parts is more important than their absolute position. In those applications, the robot has to be forgiving and accommodate assembly tolerances rather than the positional uncertainty. A good absolute position before assembly may be helpful in reducing the search range during assembly since position control is used to get to a starting point for the assembly. A vision system which gives relative position before the parts to be mated come into contact can help reduce an aimless search.

The prior art apparatus can be broadly classified into two types: passive apparatus and active apparatus. One type of such passive device, namely, a remote center compliance device, described in U.S. Pat. No. 4,720,923, U.S. Pat. No. 4,627,169 and U.S. Pat. No. 4,537,557, are very effective in producing assemblies for the specific part they have been designed for. However, these passive devices lack a general utility, can not cover a large class of assembly tasks without resorting to another part specific device and do not actively position and rotate the mating parts relative to each other which gives longer assembly times, requirements on higher accuracy of the robot and a higher risk of a robot malfunction.

On the other hand, in the active apparatus case, e.g., an industrial robot equipped with a force sensor, the interaction forces are measured, fed back to the controller, and used to modify, or even generate on-line, the desired trajectory of the robot end-effector. As is also well known, motor torques in combination with a robot model can be used to determine the desired trajectory of the end-effector. The accuracy obtained using motor torques and a robot model is not as good as the accuracy obtained using a force sensor.

Although a robot with active force control has the advantage of being versatile and programmable for different applications, it requires a more advanced control system and an adapted programming to specify how the robot has to interact with the external constraints. Past and present research has focused on the study and implementation of the control strategy to enable the robot to establish stable and gentle contact while interacting with the environment. At present, there does not exist a high level programming language nor an easy programming concept to exploit the force control capability.

Introducing force feedback to an industrial robot only enables the robot to respond to an environmental force, which, in no circumstances, mandates how the robot should move towards parts mating. In other words, successful force feedback control alone only tries to avoid high contact force, or separation tendency, and lacks a mechanism that would bond the parts together according to their geometrical contour. For example in the assembly of a gear, while a force control enabled compliant robot would ensure that no jamming/galling would occur, it would not lead the robot toward a correct alignment of the mating pieces. The conventional thinking of modifying the robot position based on the interaction force is cumbersome and difficult if not at all impossible to implement in the cases where the mating parts uncertainty is high and the combinations of possible parts contact situations are numerous and mathematically impossible to handle.

Therefore it is desirable to provide a method and apparatus for simple and effective force control based assembly strategy for successful parts mating. It is also desirable to provide an assembly strategy and programming concept that can easily build upon existing position controlled robots to perform complex assembly tasks. It is further desirable that the assembly strategy and programming concept be applicable to various control strategies including but not limited to the admittance control based force control strategy.

SUMMARY OF THE INVENTION

A system for operating an industrial robot that has an end effector for holding a first work piece to be mated to a second work piece held at a location and orientation not precisely known to the robot. The robot also has a predetermined number of articulated joints, with each joint having its own actuation device and motion measurement device. The system comprises:

a computing device which has in it program code usable by the computing device. The program code comprises:

code configured to superimpose on a force measurement from the robot at least one force vector that subjects the end effector to a force that causes the end effector to move the first work piece towards the location and orientation in which the second work piece is held.

DESCRIPTION OF THE DRAWING

FIG. 2 shows a typical program syntax that can be used in the present invention.

DESCRIPTION OF THE PREFERRED EMBODIMENT(S)

Figure 1:
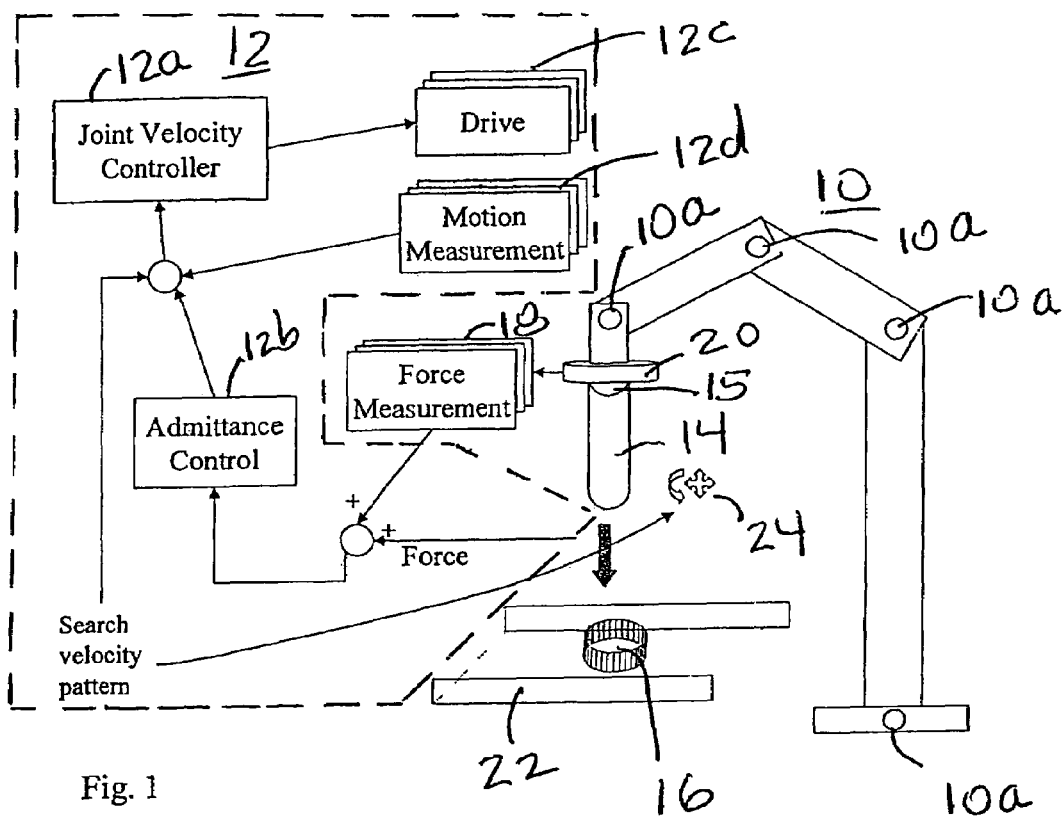
FIG. 1 shows a preferred embodiment for the robotic system of the present invention.

FIG. 1 illustrates a preferred embodiment of the robotic system that can be easily programmed for assembly tasks.

Shown in FIG. 1 is an articulated industrial robot 10 interfaced with a computer controller 12 where the method of the present invention is implemented. Computer controller 12 comprises joint velocity controller 12a, admittance control 12b and for each articulated joint 10a of robot 10 a mechanical actuation device or drive 12c and a motion measurement 12d. Not shown in FIG. 1 is the processor which is part of controller 12.

In a typical industrial robot, there are four to seven articulated joints and when controlled synchronously, the end-effector 15 of the robot 10 can move in a three dimensional task space and follow a pre-designed trajectory. As described above, each joint would have its own mechanical actuation device or drive 12c, typically a servomotor, and measurement device 12d, typically a resolver or encoder to measure the joint angle. The admittance function provided by control 12b is defined as the velocity of the robot end-effector 15 in response to the environmental forces applied to the end-effector and is used to analyze and synthesize the force feedback control to achieve stability and agility. Thus the admittance function defines the dynamics of how the reference speed input to the joint velocity controller 12a is affected by the measured force changes.

In a conventional industrial robot, the computer controller takes the inputs from each joint position measurement, and drives the servomotor so that the end-effector can be accurately positioned in the task space. This apparatus and its control method are sufficient for tasks where work object position is known to the robot controller and contact between the robot and work object is minimal, for example, in painting and arc welding applications.

For a simple application shown in FIG. 1, where a peg 14, held by the robot 10, has to be inserted in the hole 16, of which its location and orientation are not precisely known to the robot controller 12, jamming, galling and unrealistically long completion time are among the very common problems for a conventional robot to perform this task.

Introducing a measurement of contact force to the robot controller 12 is a very natural first step to address the problem, as pointed out in DE Patent No. 3439495. However, doing such would fundamentally change the industrial robot in the following aspects:

First, the contact dynamics has to be addressed adequately in the feedback control loop so that desired contact behavior (e.g., stable and gentle) can be achieved. Stable and gentle contact behavior is largely ignored and treated as disturbance in the conventional position controlled robot. Further the interaction force between the parts to be mated cannot exceed a maximum value since exceeding that value raises the risk that the product to be assembled by the robot will have a shorter life time, a lower performance or may even break when it is used.

Second, a guaranteed gentle contact only would not lead to successful assembly. Rather it is how the robot is commanded to react to a difficult contact situation, e.g., a splined shaft insertion in an automotive transmission assembly, that dictates how fast the task can be performed. As pointed out before, the conventional robot positional programming concept is difficult to be adapted into these applications.

To this end, the preferred embodiment shown in FIG. 1 provides an integral method to address the above problems.

Taking the input, represented in FIG. 1 by force measurement 18, from a six-axis force/torque sensor 20 mounted on the robot wrist, an attraction force vector 26 generated by the not shown processor in the computer controller 12 is superimposed on the measured force in a preferred direction or orientation. The attraction force vector 26 is specified in the program which is executed by the processor. It should be appreciated that the force vector 26 may also be a repulsive force vector as the same may be needed during the assembly of the mating parts and the force provided by the vector whether it is that of attraction or repulsion need not be constant.

The attraction force vector 26 is imposed on the robot so that the robot end-effector 15, where one of the mating parts such as for example peg 14 is mounted, is always subject to a force which may be constant, that is, the absolute value of the vector. When no contact is established by the end-effector 15 with the plate 22 where the other of the mating parts such as for example hole 16 is located, this attraction force will always drag the end-effector 15 toward that location until a proper contact is established.

Taking the example of the peg-in-a-hole assembly as shown in FIG. 1, if the plate 22 is placed under the robot end-effector 15, with the location of the hole 16 not known, and a downward attraction force (e.g. 60N) is imposed, this downward force would tend to drag the peg 14 down towards the plate 22 before the 60N contact force is achieved. In this case, no positional command has to be sent to the robot controller 12. In other words, the robot controller 12 does not have to know before hand if the plate 22 is 100 mm or 200 mm away from the tip of the peg 14. The other use of the attraction force vector will be illustrated later in the description.

Once the contact with the plate 22 is established, the contact behavior are mainly addressed in the admittance control block 12b, where the force/torque value are converted into a velocity command value and parameters are designed for stable and gentle contact. As is shown in FIG. 1, the input to admittance control block 12b is the sum of the output of force measurement 18 and the attraction force vector 26. The output of admittance control block 12b is one input to joint velocity controller 12a which adjusts drive 12c so that the contact force of peg 14 with plate 22 is minimized. While this function of an admittance control block is well known to those of ordinary skill in the art and is described in Wyatt S. Newman, "Stability and Performance Limits of Interaction Controllers", ASME Journal of Dynamic Systems and Control, 1992 its use in combination with the attraction force vector 26 was not known until the present invention known.

Suppose the tip of the peg 14 is now in contact with the top surface of the plate 22, but the location of the hole 16 is unknown to the robot controller 12. As is shown in FIG. 1, a search velocity pattern 24 in a plane parallel to the plate surface is superimposed by the processor in controller 12 on the velocity command 28 from the admittance control block 12b. An example of the search pattern in this case might be a circular motion or a spiral motion in a plane parallel to the plate surface to cover the possible location of the hole. As long as the uncertainty of the hole location is within the possible range of the search pattern, eventually the peg 14 will have a perfect fit with the hole 16, at which time, the attraction force would automatically drag the robot downward again for the peg to be inserted into the hole 16. As can be appreciated the search range should be selected to cover the maximum possible uncertainty in the location of the hole 16 on plate 22. Again, the robot controller 12 does not have to provide a positional command to drive the robot to go downward. While in the embodiment described herein the search velocity pattern 24 is in a plane parallel to the plate surface it should be appreciated that in other applications the pattern may be in at least two directions and orientations that makes mating of the work pieces possible.

During the entire process, the robot computer controller 12 only has to provide the: 1) designed application appropriate attraction or repulsion force; 2) proper search pattern to encompass parts uncertainty; and 3) criteria to know when the task is completed.

FIG. 2 shows a typical program syntax to accomplish the above task.

Figure 3:
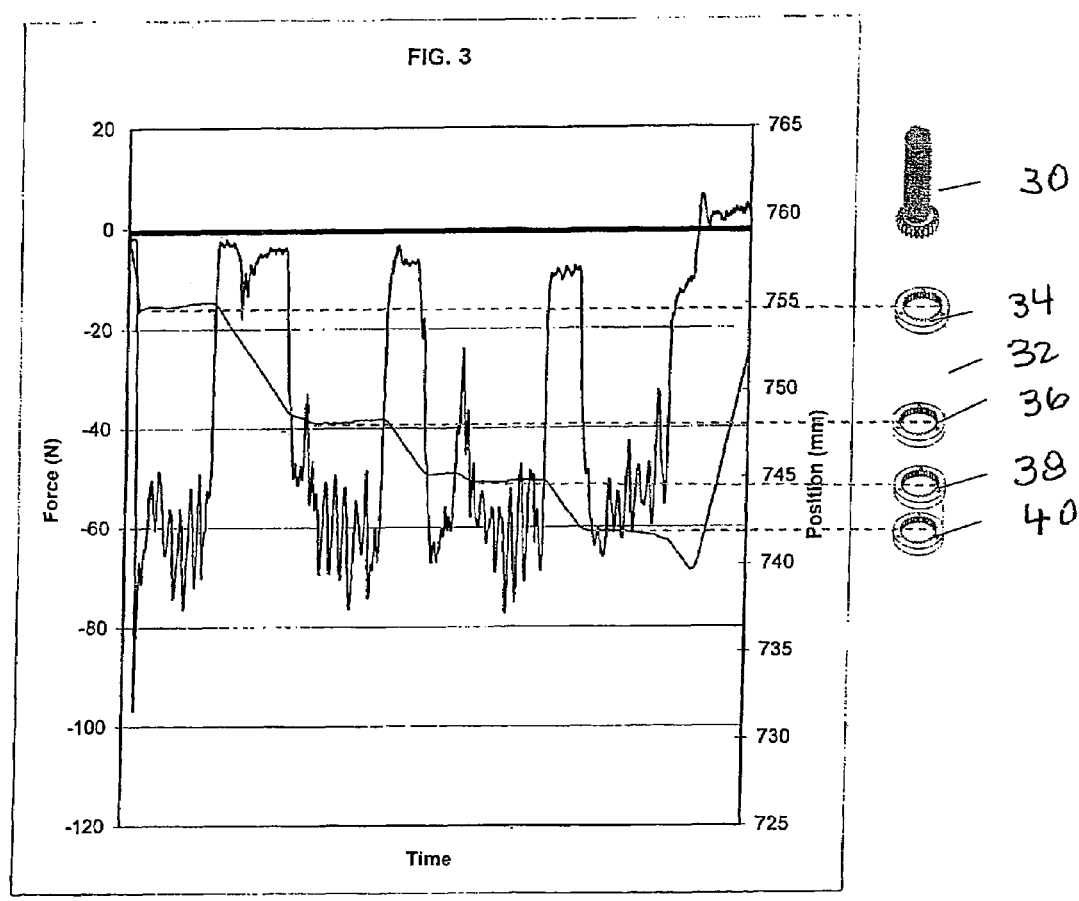
FIG. 3 shows one example of the interaction force with respect to robot position for the assembly of an automobile component.

FIG. 3 shows one example of the interaction force with respect to robot position for the assembly of an automobile component that has a toothed peg 30 which has to be inserted into a compartment 32 so that the four-layers of toothed rings 34, 36, 38, 40 of compartment 32 are aligned with the peg 30. The robot holds toothed peg 30.

To simplify the presentation, only Z-direction force and position are shown in FIG. 3. As it can be seen, initially, the parts are not in contact, and the contact force is zero, while the robot is moving downward. Once the first layer of ring 34 is in contact, the robot stops moving downward, and engages in search motion while the contact force is maintained around the pre-defined magnitude. As soon as the ring 34 is mated with the toothed peg 30, the robot continues to move toward the second layer of ring 36, so on and so forth, until all of the layered rings 34, 36, 38, 40 are mated with peg 30. When that mating occurs the robot retracts and the contact force is reduced to zero.

Obviously, many modifications and variations of the present invention are possible in light of the above teachings. It is, therefore, to be understood that within the scope of the appended claims, the invention may be practiced otherwise than as specifically described.

Figure 4:
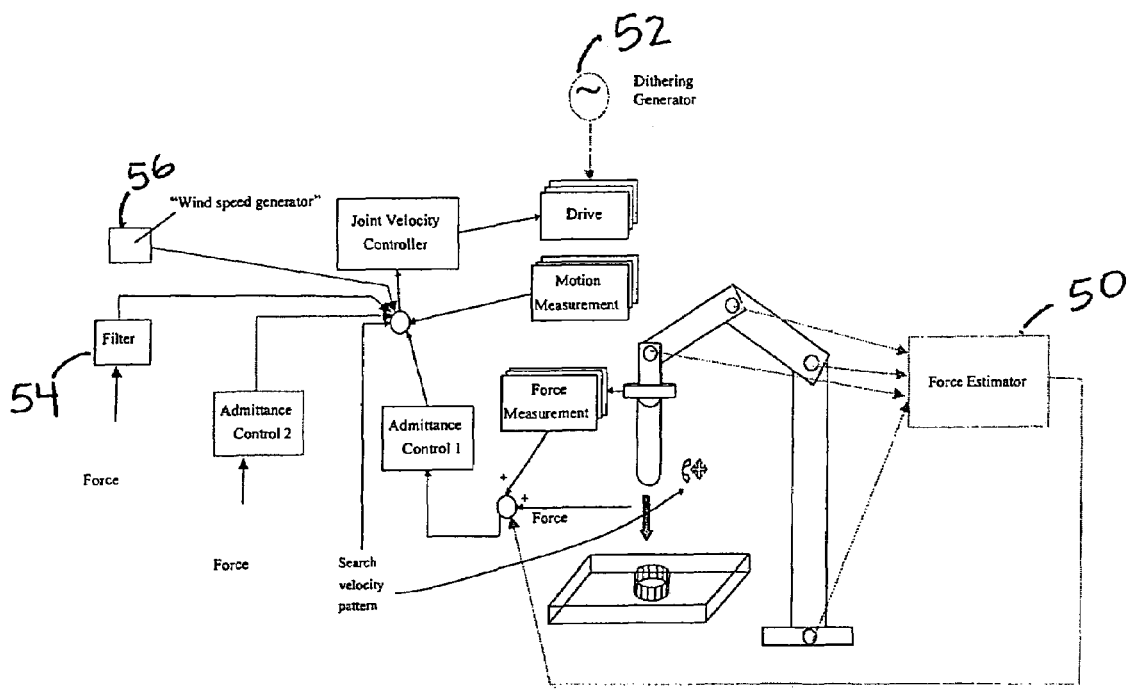
FIG. 4 shows another embodiment for the present invention.

FIG. 4 shows some different variations that follow the principle described above. For example, instead of using the 6-DOF force/torque sensor described in connection with FIG. 1, the interaction force can be estimated from motor torque via a force estimator 50, coupled with a dithering generator 52 to reduce friction effect. Alternatively the admittance controller can be replaced by control filter 54; or a "wind speed generator" 56 can be used in cascade with the velocity controller 12a to adapt to other applications. The admittance control function is actually a filter to dynamically generate a speed in response to the measured force signal.

An example of such a filter is $ks/(s^2+as+b)$ where s is the derivation operator, and to give the filter a better low frequency character, $ks/(s+c)$ $(s^2+as+b)$ can be used or $k(s+d)/(s+c)$ $(s^2+as+b)$. Of course much more elaborated filters can be adopted to optimize the speed response dynamics as a result of interaction forces. To further optimize the assembly results, the attraction/repulsion force vector could need another tuning of the admittance control than the measured force signal and then a separate admittance control filter or a special filter can be used for the attraction/repulsion force vector (see FIG. 4). With no filter at all for the attraction/repulsion, the assembly process can actually be dragged/pushed by a speed signal, named "wind speed" in FIG. 4, even if this does not give the same high assembly performance as using the attraction/repulsion force.

The present invention can also be used in other applications where process force cannot be ignored for control purposes. The list of such applications include, but are not limited to:

1. Instead of controlling all of the degrees of freedom of the articulated industrial robot with force feedback, an active compliant gripper with just 1 or 2 degrees of freedom can be made for the pick and place of either heavy or easy to break components in the automobile industry. Therefore, instead of the 6-DOF force/torque sensor, a 1 to 5 DOF sensor could also be used.
2. In precision grinding and polishing where quality is dictated by the contact force between the tool and the work piece.
3. In robotic friction stir welding, where the penetration force and moving speed has to be well coordinated.
4. With the robot being compliant, it is possible to let the robot automatically search and identify corners, holes, surfaces, etc. on the work piece to facilitate robot programming. With acceptable robot accuracy, such systems can also be used for autonomous measurement. Further the present invention allows parts to be mated even when the part on the work table is moving on a conveyor.

While the present invention is described above in connection with FIGS. 1 and 4 where the second work piece is on a plate 22 it should be appreciated that the second work piece may be held in any orientation as for example by an industrial robot.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system for operating an industrial robot that has an end effector for holding a first work piece to be mated to a second work piece held at a location and orientation not precisely known to said robot, and a predetermined number of articulated joints, each joint having its own actuation device and motion measurement device comprising:

a computing device having therein program code usable by said computing device, said program code comprising:

code configured to superimpose on a force measurement from said robot at least one force vector that subjects said end effector to a force that causes said end effector to move said first work piece towards said location and orientation in which said second work piece is held.

2. The system of claim 1 wherein said program code further comprises code configured to provide a velocity command for driving each of said actuation devices to minimize the force upon contact of said first and second work pieces.

3. The system of claim 2 wherein said program code further comprises code configured to use position control before said velocity command is provided to bring said first work piece to a starting point for assembly with said second work piece.

4. The system of claim 3 wherein said program code further comprises code configured to disable said position control after said velocity command is provided.

5. The system of claim 1 wherein said program code further comprises code configured to provide a signal for driving each of said predetermined number of actuation devices and when said end effector makes contact with said location and orientation in which said second work piece is held superimposing on said driving signal a search velocity pattern in at least two directions and orientations that makes mating of said work pieces possible to cause said end effector to bring said first work piece in contact with said second work piece.

6. The system of claim 5 wherein said program code further comprises code configured to continue said superimposed search velocity pattern after said first and second work pieces first come into contact until said first and second work pieces mate.

7. The system of claim 1 wherein said program code further comprises code configured to continue said force vector when said first and second work pieces come into contact to aid the mating of the work pieces.

8. The system of claim 1 wherein said program code further comprises code configured to use position control to bring said first work piece to a starting point prior to superimposing said at least one force vector.

* * * * *